(12) United States Patent
Reid et al.

(10) Patent No.: US 9,378,380 B1
(45) Date of Patent: Jun. 28, 2016

(54) SYSTEM AND METHOD FOR SECURELY STORING AND SHARING INFORMATION

(71) Applicants: Thomas Alan Reid, Athens, OH (US); Mark Edmonson Moffitt, Columbus, OH (US)

(72) Inventors: Thomas Alan Reid, Athens, OH (US); Mark Edmonson Moffitt, Columbus, OH (US)

(73) Assignee: Reid Consulting Group, Athens, OH (US)

(*) Notice: Subject to any disclaimer, the term of this patent is extended or adjusted under 35 U.S.C. 154(b) by 76 days.

(21) Appl. No.: 13/665,861

(22) Filed: Oct. 31, 2012

Related U.S. Application Data

(60) Provisional application No. 61/553,883, filed on Oct. 31, 2011.

(51) Int. Cl.
- *H04L 29/06* (2006.01)
- *G06F 21/60* (2013.01)
- *G06F 21/62* (2013.01)
- *H04L 9/30* (2006.01)

(52) U.S. Cl.
CPC .......... *G06F 21/602* (2013.01); *G06F 21/6218* (2013.01); *H04L 9/30* (2013.01)

(58) Field of Classification Search
CPC ............................ G06F 21/602; G06F 21/6218
USPC ........................................................ 713/153
See application file for complete search history.

(56) References Cited

U.S. PATENT DOCUMENTS

| | | | |
|---|---|---|---|
| 8,566,578 B1* | 10/2013 | Banerjee | H04L 9/088 709/217 |
| 8,799,322 B2* | 8/2014 | deMilo | G06F 17/30082 707/791 |
| 9,137,222 B2* | 9/2015 | Haeger | H04L 63/061 |
| 2004/0078593 A1* | 4/2004 | Hind | H04L 63/0281 726/26 |
| 2007/0192836 A1* | 8/2007 | Shiran | H04L 9/321 726/4 |
| 2008/0104705 A1 | 5/2008 | Hasbun | |
| 2009/0228950 A1 | 9/2009 | Reed et al. | |
| 2010/0122120 A1 | 5/2010 | Lin | |
| 2011/0055202 A1 | 3/2011 | Heimendinger | |
| 2011/0066863 A1 | 3/2011 | Katzenbeisser et al. | |
| 2012/0257759 A1 | 10/2012 | Nick et al. | |
| 2013/0275470 A1 | 10/2013 | Cao et al. | |
| 2013/0297662 A1 | 11/2013 | Sharma et al. | |
| 2014/0046708 A1 | 2/2014 | Werner | |
| 2014/0068202 A1 | 3/2014 | Goddard | |
| 2014/0082749 A1 | 3/2014 | Holland et al. | |
| 2014/0129047 A1 | 5/2014 | Barrett | |
| 2014/0245012 A1 | 8/2014 | Arya et al. | |

OTHER PUBLICATIONS

International Search Report and Written Opinion dated Feb. 2, 2016; International Application No. PCT/US2015/059717; International File Date Nov. 9, 2015.

* cited by examiner

*Primary Examiner* — Teshome Hailu
(74) *Attorney, Agent, or Firm* — Vorys, Sater, Seymour and Pease LLP

(57) ABSTRACT

A secure information storage system is disclosed. In an example embodiment, the secure information storage system comprises a first proxy system, a cloud storage system, an exchange registry, an access portal and a cloud-registry interface.

21 Claims, 13 Drawing Sheets

SYSTEM AND METHOD FOR SECURELY STORING AND SHARING INFORMATION

CROSS-REFERENCE TO RELATED APPLICATIONS

This application claims priority to U.S. Provisional Patent Application Ser. No. 61/553,883 entitled "System and Method for Securely Storing and Sharing Information" filed Oct. 31, 2011, which is incorporated by reference in its entirety as if fully set forth herein.

TECHNICAL FIELD

The present application generally relates to systems, devices, and methods for securely storing and sharing confidential information. More specifically, the present application relates to a secure key-value cloud computing storage and retrieval system using public key encryption controlled by the information owner. The present application also describes a registry to validate and coordinate the sharing of confidential information stored in the cloud computing storage among multiple parties.

BACKGROUND

Certain methods and systems previously been used for securely storing and sharing confidential information. Some such systems employ cryptography, such as public/private key encryption, to protect information.

Cryptography alone is insufficient to protect certain confidential information, such as healthcare information, for example. Regardless of the strength of the encryption technique, the encrypted confidential information is only as secure as the control of the keys for encryption and decryption.

Accordingly, there is a need for systems, methods and devices that enable secure management of encryption keys. Specifically, a need exists for a system for securely storing and sharing information which manages encryption keys separately from the encrypted information to limit access to underlying information only to those who are authorized.

SUMMARY

According to a first aspect of the present application, a method is disclosed for securely storing information. The method comprises receiving, by a first proxy, information to be securely stored. The method further comprises assigning, by the first proxy, registration information to an information owner. The registration information comprises a unique public/private key pair. The method also comprises populating, by the first proxy, a registry with the registration information and generating, by the first proxy, encrypted information based on the information and the unique public/private key pair. The method still further comprises storing, by the first proxy, the encrypted information on a cloud storage system of a cloud storage provider. The method may be performed such that the private key is maintained by the first proxy and not shared with the registry or the cloud storage provider.

According to a second aspect of the present application, a system is disclosed for securely storing and accessing information. The system comprises an information owner system of an information owner for providing information to be securely stored. The system further comprises a cloud storage system of a cloud storage provider and a registry maintained and controlled a registry controller. The system also comprises a first proxy system which processes certain instructions.

The instructions are for: receiving the information to be securely stored; assigning registration information to the information owner, the registration information comprising a unique public/private key pair; populating a registry with the registration information comprising the public key; generating encrypted information based on the information and the unique public/private key pair; and storing the encrypted information on a cloud storage system of a cloud storage provider. The system may be utilized such that the private key is retained by the first proxy and not shared with the registry or the cloud storage provider.

BRIEF DESCRIPTION OF THE DRAWINGS

The accompanying figures, which are incorporated in and constitute a part of the specification, illustrate various example systems, devices methods, and so on, and are used merely to illustrate various example embodiments. It should be noted that various components depicted in the figures may not be drawn to scale, and that the various assemblies and designs depicted in the figures are presented for purposes of illustration only, and should not be considered in any way as limiting.

DRAWING REFERENCE NUMERALS

Figure 1:
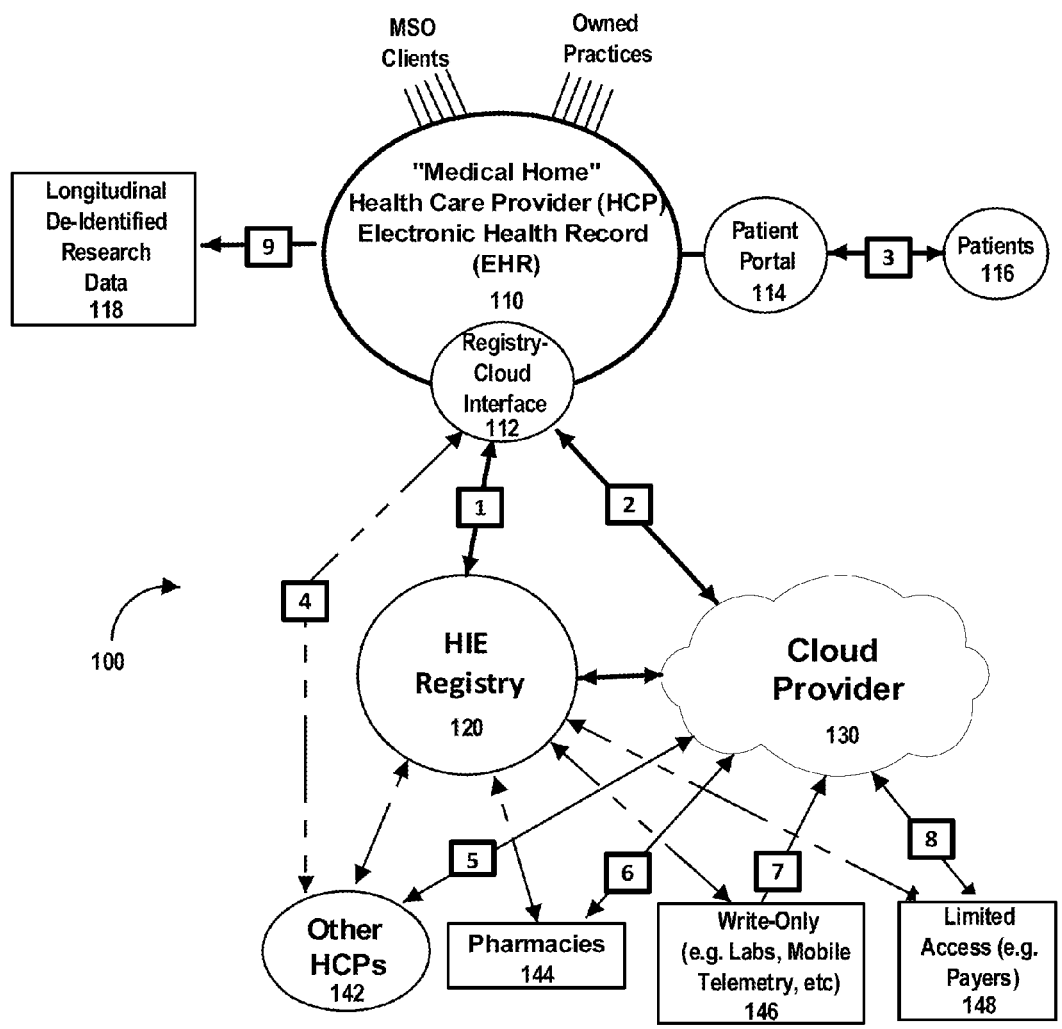
FIG. 1 is a schematic block diagram illustrating an example environment for the systems, devices and methods of the present application.

The following reference characters identify the associated elements depicted in the drawings describing the present invention.

| | | | |
|---|---|---|---|
| 100 | Exemplary environment | 146C | Other Write-Only HCP |
| 110 | Medical Home HCP | 148 | Payers/limited access participants |
| 112 | Registry-Cloud Interface | 212 | File Access Permissions Directory |
| 114 | Patient Portal | 310 | Government and Industry DBs |
| 116 | Patient | 610 | Emergency Room HCP |
| 118 | De-identified Research DB | 612 | Registry-Cloud Interface |
| 120 | HIE Registry | 910A-910E | HCPs |
| 130 | Cloud Provider | 920A-920C | HIE Registries |
| 142 | Other HCP(s) | 1010 | HCP #1 |
| 144 | Pharmacies | 1011 | HCP #2 |
| 146 | Labs/other write-only participants | 1048 | Write-Only Provider(s) |
| 146A | Home/Mobile Telemetry | 1030A | Cloud Provider #1 |
| 146B | Lab(s) | 1030B | Cloud Provider #2 |
| 210 | Encrypted EHR Files | | |

DETAILED DESCRIPTION

This present application describes systems, devices and methods for securely storing and sharing information. Specifically, the present application describes a secure key-value cloud storage and unified file exchange design that together create a generalized framework for the sharing of confidential information among multiple parties. The exchange is facilitated by an exchange registry while leveraging the cost-effectiveness of cloud storage. The systems and method may comprise:

Use of individual public key encryption to secure files prior to transmission to Cloud Storage.

The individual's private key used for decryption of files may be retained by an individual or an individual's proxy, such as an individual's health care provider ("HCP"), an individual's lawyer, a key-creation and retention service, for example.

Use of the individual public keys as an indexing element (optionally contained in unencrypted file metadata) to allow for the identification and sharing of an individual's files in the cloud storage.

Use of additional unencrypted file metadata to support the specific application, including the ability to achieve granularity of access based on the classification of the file.

An approach for storing unstructured data in a key-value (object) data stores to simplify sharing and reduce the need for a relational database, yet retain the ability to transfer such information to/from relational databases.

An exchange registry for authentication of additional organizations or individuals to:
  Determine and catalog unique identities of individuals or organizations, registrants, whose files will be stored and exchanged.
  Verify and catalog the identity and role of the registrants wishing to participate in the exchange.
  Verify and catalog authorization from an individual, an individual's proxy, an organization or an organization's proxy of rights for other registrants to access the individual's or the organization's files.
  Function as a clearinghouse of the public keys of registrants and individuals and related cloud storage destinations.

Exchange registry-cloud interface software operated by the individual or the individual's proxy for:
  Establishing a unique identity in communications with the exchange registry;
  Generation and assignment of public and private keys;
  File encryption and decryption;
Writing and reading files from cloud storage;
Secure key exchange;
Conversion of files to/from proprietary to industry standard formats;
  Conversion of files between key-value data stores to/from relational databases; and
  Creation of hybrid cloud and on-premise storage solutions.
Ability for registrants to write files encrypted with the individual's public key to the cloud storage.
Permission directory for cloud provider from exchange registry to verify identity and authorization of registrant attempting to retrieve an individual's files from cloud storage.
Mechanism for the individual or the individual's proxy to securely transmit the individual's private key to another registrant to permit decryption of the individual's files after retrieval from cloud storage.
Ability for the individual to audit activity on his/her files.
Capability to provide a holistic view of the individual's files for individual or authorized registrant.
Ability to de-identify the individual's files to facilitate academic or business research.
Design supports existence of multiple exchange registries and multiple cloud providers.
Design supports provision of exchange registry by cloud provider.

The systems, devices and methods of the present application are well suited to operate in any industry requiring secure storage and exchange of information. The present application will describe an exemplary embodiment in the health care industry. Of course, one of ordinary skill in the art will appreciate that the systems, devices and methods of the present application have applicability in other industries, such as the legal service industry and the real estate industry, for example.

Recently, the storage requirements with respect to patient files and the Federal mandates to share records with other health care providers have presented daunting problems for those in the health care industry. The exemplary systems and methods described herein, generally referred to as a unified health exchange ("UHE"), may be used to solve many of the problems created by the increased storage and usage demands in the industry. The operation of the overall mechanism of the UHE will be described with particular applicability to the health care industry. In the health care application of the design consider the correspondence in the following Table I.

TABLE I

| Generalized | | Health Care Specific |
|---|---|---|
| Secure Key-Value Cloud Storage and Unified File Exchange | = | Unified Health Exchange |

TABLE I-continued

| Generalized | | Health Care Specific |
|---|---|---|
| Exchange Registry | = | Health Information Exchange (HIE) Registry |
| Individual | = | Patient |
| Individual's Proxy | = | Health Care Provider serving as Patient's "Medical Home" |

Problems in the HealthCare Industry

The UHE described herein solves critical and previously intractable challenges in the health care industry while simultaneously providing efficient use of resources and generating cost-savings. Health care providers ("HCPs") face mounting expenses and downward pressure on reimbursements. Federal mandates require layers of expensive technology that increase the cost of doing business.

Increased Storage Demands

Storage demands for electronic health records ("EHR") continue to expand dramatically, driven by factors including high resolution imaging data, structured and unstructured data, longitudinal care needs and regulatory retention requirements. The combination of increased demand and high cost storage results in rapidly growing IT costs for the HCPs.

Cloud services can dramatically reduce this cost, but cloud providers have been wary of the liability of storing health care records. The Unified Health Exchange solution encrypts records prior to moving them to the cloud and the cloud providers never possess the decryption key. This combination eliminates the need for the cloud providers to conduct breach notifications, greatly diminishing their HIPAA exposure.

By relying on the cloud provider for long-term record retention, the HCPs can dramatically reduce the volume and thus the cost for on-premise computer storage. By leveraging intelligent archiving, the HCPs may retain on-site only the records needed in the short-term. Further, the UHE approach can eliminate duplication of records within a single HCP as well as the duplication of records received from other health care providers.

Financially Sustainable

Existing models for health information exchange involve cumbersome hierarchies of regional, state and national exchanges that have failed to gain traction. The financial models underpinning most HIE's do not offer a sustainable path, primarily because the current HIE model adds incremental costs for HCPs at a time of great budget pressure. Health Care Providers are under increasing deadline pressure to achieve "meaningful use" of health information exchanges.

The Unified Health Exchange design enables HIE by default as a byproduct of the cost-saving storage arrangement with the cloud provider combined with the coordination functions of the HIE Registry. Thus the HCP saves money on storage and avoids the cost of supporting a separate HIE infrastructure.

Medical Home

The emerging "medical home" concept offers tremendous promise for coordination of care to improve wellness and reduce costs. The lack of health information exchange continues to hamper implementation of the "medical home" and other innovations such as accountable care organizations (ACOs). Unified Health Exchange consolidates patient records, offering the "medical home" a holistic picture of the patient. A "patient dashboard" may provide an easy overview of the patient's medical history and quick review of recent activity and condition.

Providers and payers struggle to identify fraud, waste and abuse. The disparate sources of information make compiling a complete view of a patient's care difficult. Once widely adopted, Unified Health Exchange can provide a single source of information for a comprehensive utilization review.

Personal health records ("PHR") have been envisioned as a key technology enabling patient education and involvement. Unfortunately, early PHR efforts have failed to:

Win support from health care providers.

Gain the trust of wary consumers over privacy concerns.

The Unified Health Exchange gives patients and/or their "medical home" unprecedented control over their medical records. Because the records are encrypted with individual keys, no one can decrypt the records until authorized for that specific individual.

Computer savvy consumers are able to directly authorize an HCP to access records and also exercise the granularity to only provide permission for specific classes of information. For instance, a podiatrist does not need access to a patient's cardiac records. With Unified Health Exchange, the patient decides who sees what. Further, an audit log of access gives the patient complete visibility regarding who has accessed what and when.

For patients unable or not interested in controlling their own health records, the patient's "medical home" can serve as the patient's proxy by obtaining written sign-off similar to existing HIPAA forms to manage the access on behalf of the client.

The HIPAA and HITECH rules regarding the privacy of health records have created confusion and additional costs across the US health care industry. Unified Health Exchange reduces HIPAA responsibility for cloud providers by encrypting the records. For HCPs, the more of their data they move to UHE the less vulnerability they retain because most data stored in local EHRs are not encrypted.

For the EHR vendors, each of the many HIEs utilize unique interfaces to their software. UHE offers a single interface through industry standard methods to connect to what could serve as a global HIE platform.

UHE Operating Environment

Referring now to FIG. 1, there is illustrated an example operating environment 100 of the UHE. Example environment 100 may comprise a medical home HCP system 110, a patient portal 114, an HIE registry 120, a cloud provider 130, and various HPC systems 142-148. As illustrated, registry-cloud interface 112 may be integrated with medical home 110 to facilitate communication with HIE registry 120. Further, a patient 116 may communicate with Medical Home 110 via patient portal 114.

In a typical operation, medical home 110 assigns a unique public/private key pair and registers patient 116 with HIE Registry 120. The public key is provided to HIE registry 120, and the private key is retained by medical home 110 as the only entity initially authorized to decrypt patient files. This activity is depicted by reference numeral 1.

Medical Home HCP 110 writes patient files encrypted with the public key to the cloud provider 130, retaining onsite only what is needed in the short term. HCP 110 can retrieve files as needed for longitudinal patient care scenarios. Medical Home HCP 110 can also access, retrieve and decrypt files written for patient 116 by other participating entities, such as HCPs 142-148. This activity is depicted by reference numeral 2.

Patient 116 authorizes secondary HCP 142 to access files. Medical home HCP 110 updates permissions in HIE Registry 120 which is passed to cloud provider 130 in routine synchronization process. Patient 116 can also audit access to his/her files. These activities are depicted by reference numeral 3.

Medical home HCP 110 sends private key of patient 116 directly to secondary HCP 142 via encrypted transmission verified with digital signatures using the respective organizations public/private key pairs. The key exchange bypasses both the HIE registry 120 and the cloud provider 130. This activity is depicted by reference numeral 4.

Secondary HCP 142 can now retrieve, decrypt and read files for the specific patient 116 using the patient's unique public/private key combination. Secondary HCP 142 can now also write files for patient 116 to same cloud provider 130 encrypted using the patient's public key. These activities are depicted by reference numeral 5.

Participation by pharmacies 144, depicted by reference numeral 6, add a useful function for coordination of medication regimens. Other entities such as labs and patient telemetry providers 146 can write files encrypted with the patient's public key, but cannot retrieve or decrypt files. This reduces HIPAA liability for these entities, and such activities are depicted by reference numeral 7.

Patient-authorized payers 148 are provided limited access to patient files. For example, payers 148 may to review metadata but not detailed file information. This activity is depicted by reference numeral 8.

Further, patients' medical homes 110 may securely contribute records to de-identified research databases 118, as depicted by reference numeral 9.

The exemplary system 100 provides a number of useful features including:
- Neither cloud provider 130 nor HIE Registry 120 ever have decryption keys, reducing HIPAA liability for these entities.
- HCPs 110, and 142-148 save resources through intelligent archiving, enabling them to retain only the files needed in the short term in expensive on-premise storage.
- Reductions in record duplication within and between HCPs 110, and 142-148 also saves resources.
- Design supports multiple cloud providers 130 and multiple HIE Registries 120.
- Design supports a "glass break" scenario for emergency access to patient files.

Unified Health Exchange Components

Figure 2:
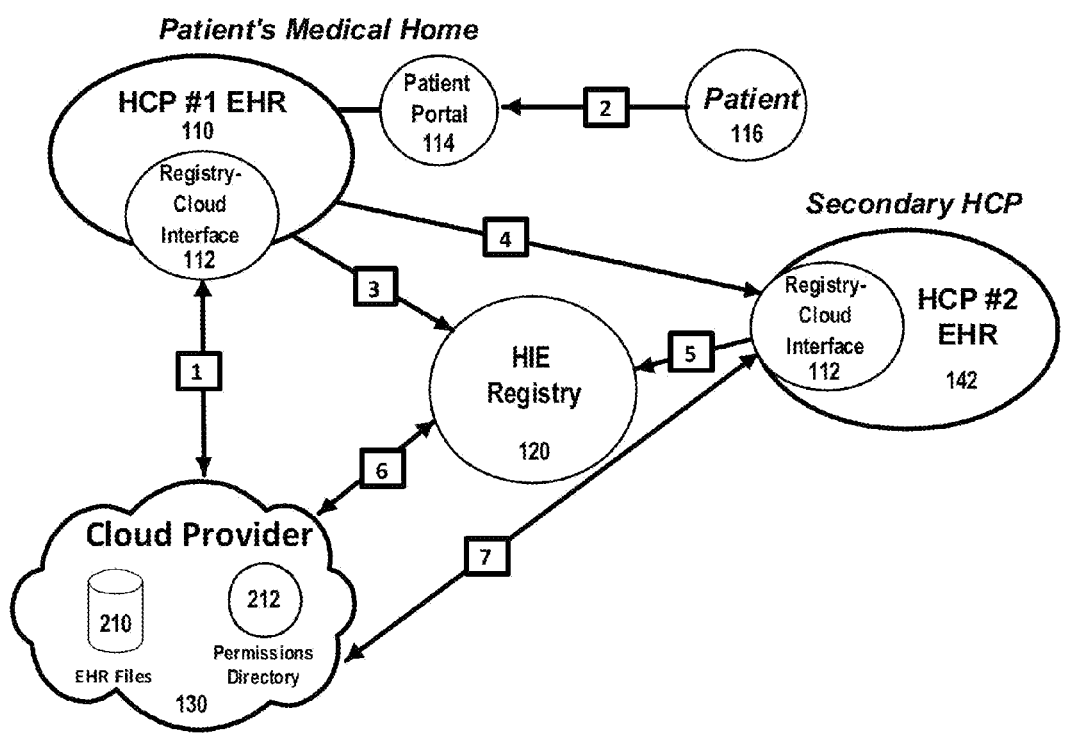
FIG. 2 is a schematic block diagram further illustrating operation of the UHE of FIG. 1.

Referring now to FIG. 2, there is illustrated a schematic block diagram further depicting operation of the UHE of FIG. 1. Each HCP accessing the storage of cloud provider 130 may comprise or access an HIE registry. In the illustrated example, medical home HCP 110 utilizes registry-cloud interface 112 and secondary HCP 142 utilizes registry-cloud interface 112. The registries provide the mechanisms and trust relationships for verifying unique identities, creating and updating patient-to-HCP and patient-to-cloud provider associations, and modifying permissions tables. Each HCP communicates with its associated HIE registry for patient identity matching to minimize duplication. Each HIE registry also retains mappings of public keys for patients, HCPs, payers and any other entities involved in UHE.

Although a single cloud provider 130 is depicted in the example embodiment, it should be clear to those of ordinary skill in the art that multiple cloud providers and/or multiple cloud storage servers may be employed. The cloud providers, such as cloud provider 130, offer low cost yet responsive storage for the HCPs key-value indexed flat files 210, which may include file metadata used for the indexing and searching. The cloud providers also retain a permissions directory 212 derived from the HIE registries for determining the mapping of which HCPs can read files for specific patients.

Each registry-cloud interface 112 comprise a software module cooperating with the HCP's Electronic Health Record ("EHR") system for issuing and/or managing patient public-private key combinations, interacting with the HIE registries and for reading/writing of files to the cloud provider(s). Each registry-cloud interface also manages private key exchanges with other HCPs.

The registry-cloud interface, in addition to performing encrypt/decrypt functions, may also convert proprietary data formats into standards-based formats. Likewise, when reading files from the cloud storage, the registry-cloud interface would convert standardized formats into proprietary formats for local EHR use.

Public Key Encryption

The patient 116 selects one HCP, HCP 110 in the illustrated embodiment, to serve as his/her "medical home." This "medical home HCP" generates a unique pair of encryption keys using a public-private key combination for the patient.

The "public key" would not actually be shared with the general public, but rather it would be shared among HCPs participating in the HIE for file encryption and as a mechanism for identifying the unique patient 116. The public key would also be appended as metadata to the files, linking the file to the patient.

The private key, retained by the medical home, would be used to decrypt the data. The Cloud Provider would not have the ability to decrypt the files. Only HCPs authorized by the patient would receive the patient's private key, HCPs, cloud providers and HIE registries also have organization-specific public-private keys utilized for secure communications and digital signatures among registrants.

Unified Health Exchange Operation

The flow of the following permissions and file accesses are depicted in FIGS. 1 and 2:
1. HCP 110, the medical home of patient 116, writes encrypted files to cloud provider 130. Files encrypted prior to transmission with patient's public key, thus already protected in motion. The files remains encrypted at rest on cloud server of cloud provider 130. HCP 110 retains private key of patient 116. Neither cloud provider 130 nor HIE registry 120 have private key, thus cannot decrypt files, reducing HIPAA liability.
2. Patient 116 authorizes HCP 110 to release records to HCP 142. Authorization granted via e-signature using patient portal 114 or via signed paper form.
3. HCP 110 updates HIE registry 120 with additional access rights of HCP 142 to read specific patient's files. Updates may be secured through digital signature based exchanges between HCP 110 and HIE registry 120.
4. HCP 110 sends patient's private key encrypted using public key of HCP 142. Process bypasses cloud provider 130 and HIE registry 120, thus only HCPs possess private keys.
5. HCP 142 updates HIE registry 120 with additional access rights of HCP 110 to read patient files it writes for patient 116.
6. HIE Registry updates permissions directory 212 of cloud provider 130, adding public key of HCP 142. Updates may be secured through digital signature based exchanges between cloud provider 130 and HIE registry 120.
7. HCP 142 can now retrieve existing patient files and write their own generated content to cloud provider 130 for the same patient 116. HCP 110 also able to retrieve the files generated by HCP 142.

Details of the HIE Registry

Listed below are examples of the types of information which may be maintained by HIE registry 120. Of course, the examples listed below are not meant to be exhaustive or prescriptive, but rather merely examples of the ways in which the underlying mechanism may operate.

TABLE B

HCP Listings

HCP Listings
Name of HCP
Type of HCP
Public Key of HCP
Date Registered
Authorization Method
Cloud Provider

TABLE C

HCP Types

HCP Types
Medical Center/Hospital
Outpatient Clinic
Physician Practice
Home Health/Hospice
Pharmacy
Health Department
Lab
Mobile/Home Telemetry

TABLE D

Patient Listings

Patient Listings
Public Key of Patient
Public Key of Medical Home
Date Registered
Authorization Method
Public Keys of HCPs Authorized to
Read and/or Write Records
Key Demographic Information for
Identity Matching
Payer(s)

TABLE E

Directory of Registries

Directory of Registries
HCP-Registry Associations
Public Keys of Other Registries The Cloud Provider Listed below are examples of the types of information that may be stored by the cloud provider 130. The list is not meant to be exhaustive or prescriptive, but rather an example of one way in which the underlying mechanism may operate.

EHR files 210 may comprise unstructured key-value indexed data store.

Metadata which may be used as key for granular permissions, searching and batch retrievals may include, but is not limited to:
Patient's Public Key
HCP's Public Key
Date of Activity
File Type
Registry Public Key HCPs may write encounter summaries to cloud provider 130 that include pertinent information such as date(s) of encounter, orders, vital signs, medications, history and physical, radiology report, physicians, discharge summary and links to image files also written to cloud provider 130. These files may adhere to industry standard formats and be in easily processed formats such as XML.

The permissions directory 212 of patients' public keys mapped to HCPs allowed to retrieve information provides an additional level of security to the mechanism beyond the data encryption. All HCP access may be verified via digital signature.

HCP Registration Process

Figure 3:
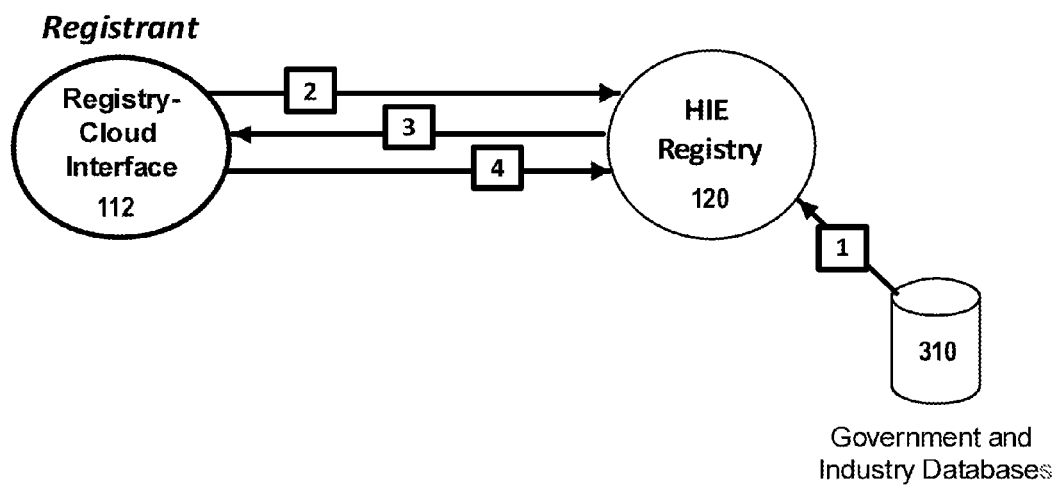
FIG. 3 is a schematic block diagram illustrating an HCP registration process using the UHE of FIG. 1.

Referring now to FIG. 3, there is a schematic block diagram illustrating an HCP registration process using the UHE of FIG. 1. An entity seeking to participate in the UHE network as a HCP may be registered as depicted in FIG. 3.

The HIE registry 120 maintains database of HCPs, labs, telemetry providers, payers and any other entities that may have permission to read and/or write patient files (Registrant). As shown by reference numeral 1, HIE registry 120 utilizes government sources and other trusted databases to assemble and verify entries in the HIE registry database. HIE registry 120 may also generate its own public/private key combination for itself as a corporate entity.

As shown by reference numeral 2, a registrant, such as HCP 142 shown in FIGS. 1 and 2, may verify its identity and authority with the HIE registry 120 through multi-factor identity verification. Once verification completed, the registrant generates its own public/private key combination to identify itself as a corporate entity. The registrant transmits its public key to HIE registry 120 encrypted using the HIE registry's public key. HIE registry 120 decrypts with own private key.

As shown by reference numeral 3, HIE registry 120 replies with an acknowledgement encrypted with its own private key. The registrant verifies HIE registry transmission by decrypting with HIE registry's public key.

As shown by reference numeral 4, the registrant completes registration with an acknowledgement to the HIE registry 120 encrypted with its own private key. HIE registry 120 verifies the registrant transmission by decrypting with the registrant's public key.

Patient Registration Process

Figure 4:
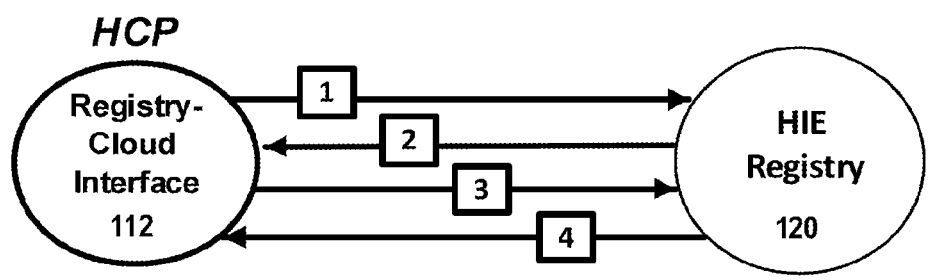
FIG. 4 is a schematic block diagram illustrating a patient registration process using the UHE of FIG. 1.

Referring now to FIG. 4, there is a schematic block diagram illustrating a patient registration process using the UHE of FIG. 1. Once an entity is registered, as described above, it can then serve as a "medical home" for the patient and conduct the registration process as depicted in FIG. 4.

First, an HCP sends identifying patient demographic information to HIE registry 120 via registry-cloud interface 112. The payload may be encrypted with the private key of the HCP, decrypted by the HIE registry 120 with the HCP's public key, confirming the identity of the HCP.

Second, the HIE registry 120 has three possible replies:
a. EXISTS: In registry, returns patient public key, medical home public key and cloud provider.
b. NEW: Created listing, requests public key of patient.
c. MORE: Indicating that additional information on patient required to determine whether unique identity.

In all three cases, the response is encrypted with the HIE's private key for decryption by the HCP with the HIE registry's public key, confirming identity of the HIE registry.

Third, the HCP replies depending on response in received in step 2:
a. ACKNOWLEDGE: HCP acknowledges receipt and session terminates.
b. REGISTER: HCP generates public/private key combination for patient. Transmits public key, ID of cloud provider and Payer(s) to HIE registry.

c. Identity confirmation process continues.

In all three cases, the response is encrypted with the HCP's private key for decryption by the HIE registry with the HCP's public key, confirming identity of the HIE registry.

Fourth, the HIE registry 120 replies depending on response received in step 3:
  a. Session completed in step 3.
  b. HIE registry acknowledges receipt and session terminates.
  c. Identity confirmation process continues.

In all three cases, the response is encrypted with HIE's private key for decryption by the HCP with the HIE registry's public key, confirming identity of the HIE registry.

Inclusion of Write-Only Participants

Figure 5:
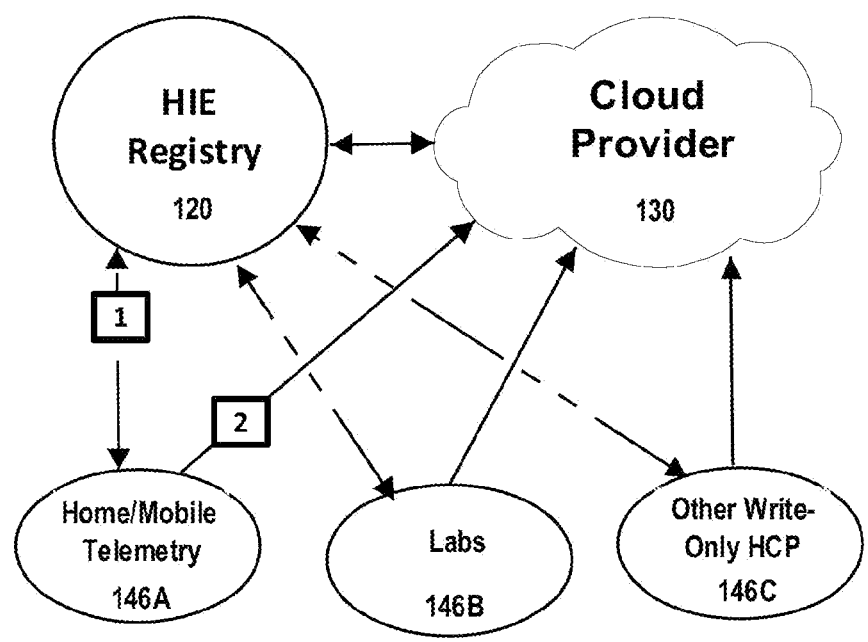
FIG. 5 is a schematic block diagram illustrating sharing write-only data using the UHE of FIG. 1.

Referring now to FIG. 5, there is a schematic block diagram illustrating sharing write-only data using the UHE of FIG. 1. Receiving and sharing lab results and home/mobile telemetry is also supported by the example UHE environment.

Certain providers in the health care field provide patient data without being allowed to receive patient data. Such providers, generally referred to generally as "write-only" providers, may include hone/mobile telemetry company 146A, labs 146B and other write-only HCPs 146C. Like other HCPs, these write-only HCPs may also associate to HIE registry 120 in the UHE network registries by following the entity registration process described above. FIG. 5 illustrates registration of a home/mobile telemetry company 146A with the UHE.

By following a process similar to patient registration, the write-only HCP 146A may retrieve a patient's public key and the ID of cloud provider 130 from the HIE registry 120. The write-only HCP 146A could then commence writing files encrypted with patient's public key. Using the write-only capability, only HCPs authorized by the patient would have the private key to decrypt the files. Further, write-only HCP 146A would not possess any patients' private keys.

"Glass Break" Emergency Care Scenario

Figure 6:
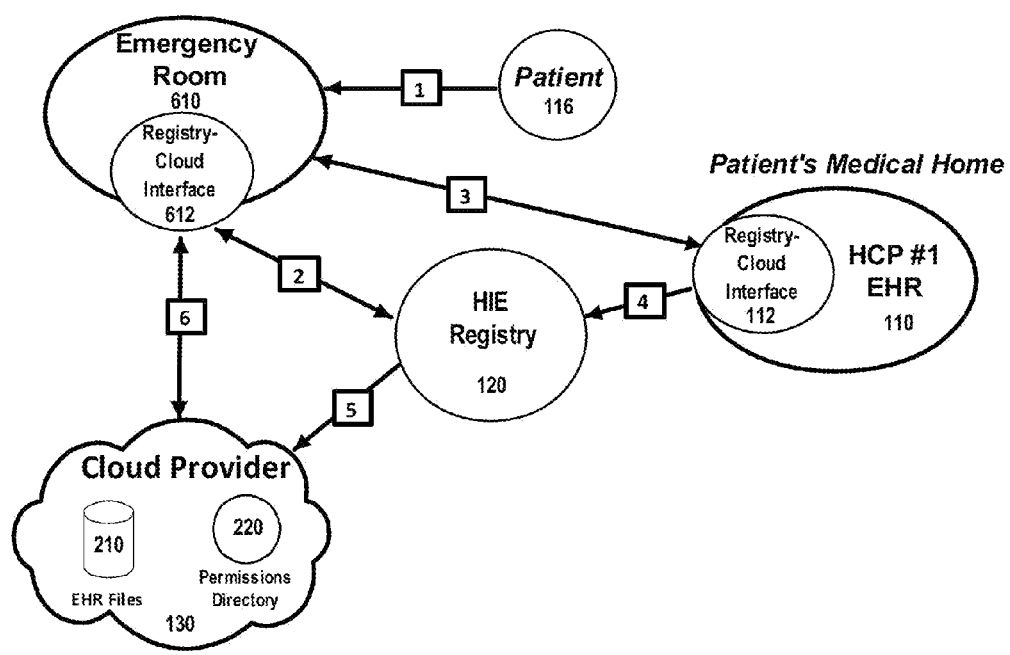
FIG. 6 is a schematic block diagram illustrating communications in an emergency situation using the UHE of FIG. 1.

Referring now to FIG. 6, there is a schematic block diagram illustrating communications within the UHE environment in an emergency situation.

It is important for an HIE solution to provide emergency rooms with access to patient data in the event of an emergency that occurs outside of the patient's normal care community. The so-called "glass break" scenario outlined in the FIG. 6, shows how such functionality may work within the UHE framework. A web-based version of this scenario supports HCPs that may not yet have deployed a registry-cloud interface.

1. Patient 116 presents to an emergency room 610, unable to provide authorization for access to his/her medical records. The emergency room 610 is not one of the patient's normal HCPs.
2. Emergency room 610 attempts to register patient 116 with HIE registry 120 via registry-cloud interface 612 and, as a result, receives patient's medical home 110, public key and cloud provider 130.
3. Emergency room 610 sends request to HCP 110 for emergency-based release of private key. Message to HCP 110 is encrypted with emergency room's private key. HCP 110 is able to decrypt message with emergency room's public key, verifying identity. Encrypted key exchange proceeds.
4. HCP 110 updates permission directory 220 via HIE registry 120.
5. HIE registry 120 updates permissions directory 220 at cloud provider 130.
6. Emergency room 610 can now retrieve and decrypt patient files from cloud provider 130. Emergency room 610 also writes encounter summary and other files generated during encounter to the cloud provider 130 for later review by HCP 110.

Detecting and Preventing Waste, Fraud and Abuse

Figure 7:
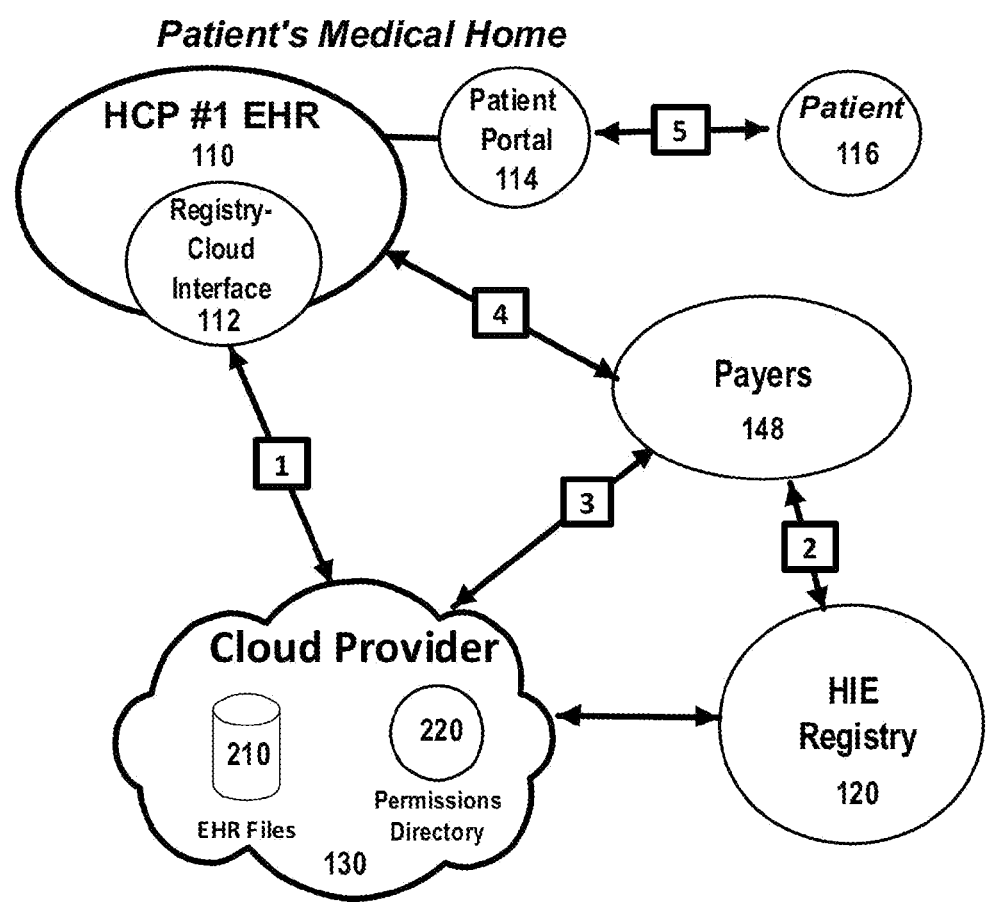
FIG. 7 is a schematic block diagram illustrating mechanisms for identifying fraud, waste and abuse using the UHE of FIG. 1.

In addition to the coordination of care and HIE benefits of UHE, the mechanisms also support analytical methods to detect and prevent waste, fraud and abuse as illustrated in FIG. 7.

1. HCP 110, medical home of patient 116, generates a summary digest of all files written to cloud provider 130 and of all other HCP reads of files for its patients. Such a summary supports coordination of care, and triggers alerts to duplicated prescriptions, and redundant tests, among other things. Further, HCP 110 provides data for patient review of activity on his/her health records.
2. Payer 148 also registers with HIE registry 120 in a process similar to registration of HCPs.
3. Payer 148, having been identified during patient registration, is able to review metadata for patients' files store by cloud provider 130, but not able to decrypt the contents. Thus payer 148 can identify some utilization trends without HIPAA impact. Insurance form submittals may also be written to cloud provider 130 by HCPs, encrypted with the payer's public key, providing a simple mechanism for securely submitting and cataloging the reimbursement paperwork. The same document may also be written to the cloud provider 130 encrypted with the patient's public key.
4. Payer 148 and HCP 110 may collaborate to identify cases of waste, fraud and abuse.
5. Patient 116 is able to review all access to their files via patient portal 114.

Support for Medical Research

Figure 8:
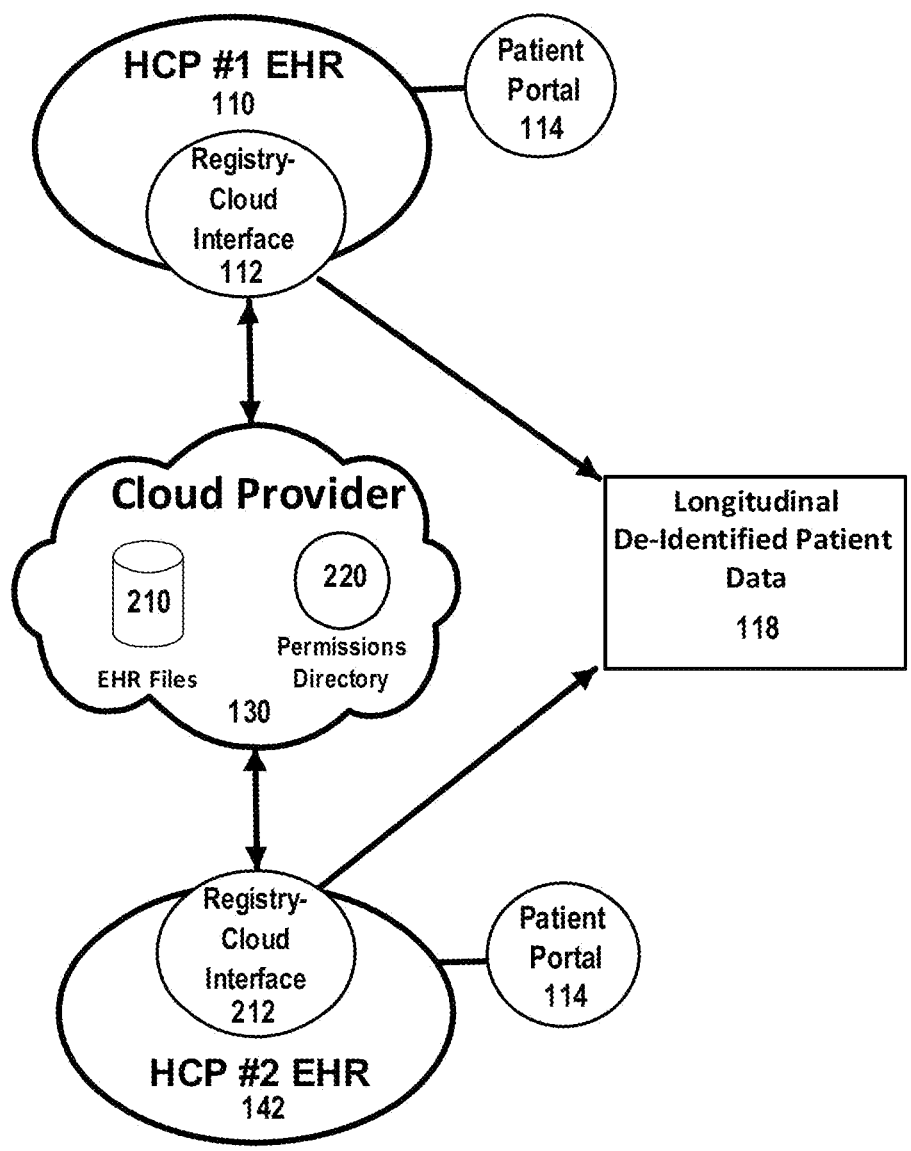
FIG. 8 is a schematic block diagram illustrating the generation of de-identified patient data using the UHE of FIG. 1.

Using the UHE environment 100 described herein, one or more HCPs may elect to generate coordinated and longitudinal de-identified patient care research databases 118. Permission to extract such information may be solicited at the time the patient 116 is authenticated at his/her medical home 110. The coordinated care benefits would ripple into the research database, providing a complete picture of the individual's health history without any personal identifiers remaining. The communication mechanisms that support the generation of de-identified patient data is illustrated in FIG. 8.

Patient's medical home 110 provides a full view of the medical status and activities of patient 116.
  Files may be written to a de-identified patient database 118 with a "scramble" of the patients' private keys to replace the public key as a patient identifier with this new number.
  The relationship of the new "scrambled" identifier to the actual patient public key may be known only to the medical home 110.
  HCP 110 may retain the mapping so that additional data for the patient can be added over time for longitudinal studies.

Multiple HIE Registries

Figure 9:
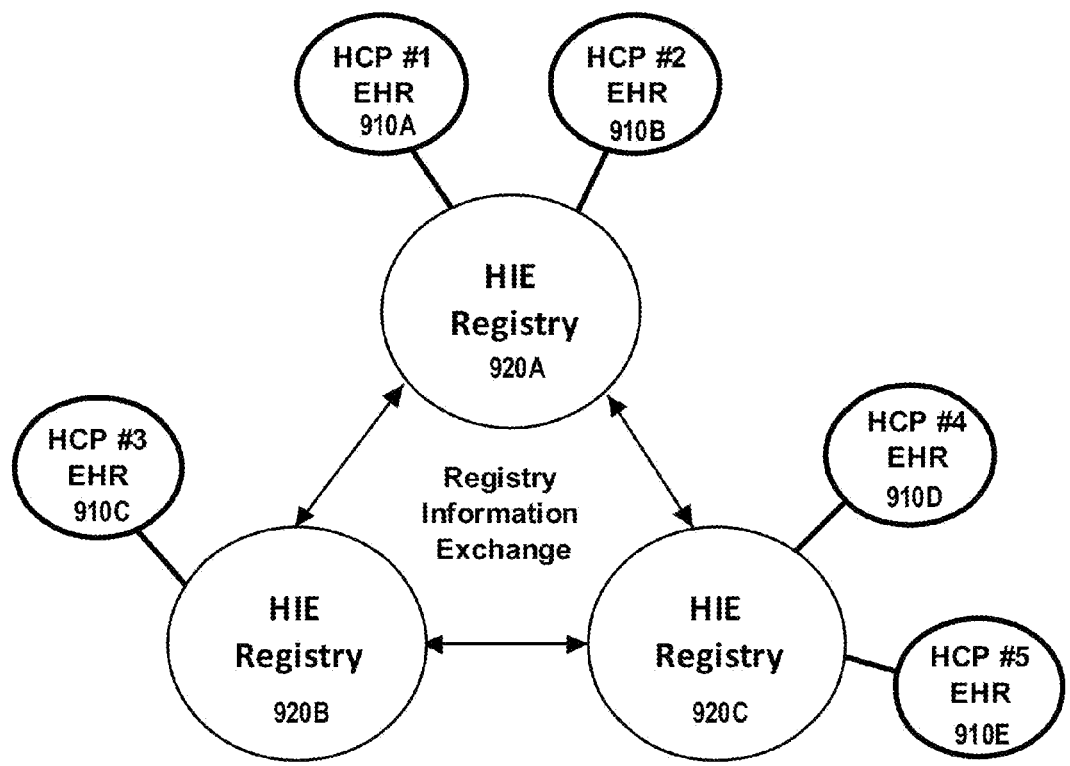
FIG. 9 is a schematic block diagram illustrating an alternate environment for the systems, devices and methods of the present application.

While it would be simpler to have a single HIE registry to serve all patients, this outcome seems unlikely in our highly competitive health care and IT markets. One of ordinary skill in the art will recognize that the UHE described herein may be embodied in alternate configurations, including an environment having multiple HIE registries as illustrated by FIG. 9.

In such an embodiment, each HCP 910A-910E associates with only one HIE registry 920A-920C. The HIE registries 920A-920C communicate with each other during:

Patient registration process to confirm uniqueness.
Exchange of HCP registrations.
Exchange of patient record permissions changes, e.g. new HCP authorized by patient.

Multiple Cloud Providers

While it would be simpler to have a single cloud provider to serve all HCPs, one of ordinary skill in the art will recognize that such a configuration may not accommodate the highly competitive health care and IT markets. Thus, the UHE design accommodates the existence of multiple cloud providers as illustrated in FIGS. 10A and 10B.

Figure 10A:
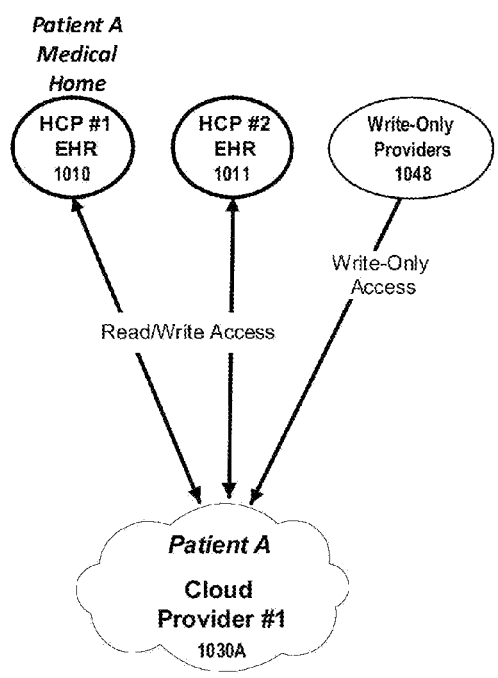
FIGS. 10A and 10B are a schematic block diagrams illustrating other alternate environments for the systems, devices and methods of the present application.

As illustrated in FIG. 10A, HCP 1010 is the medical home for patient A. HCP 1010 designates cloud provider 1030A for patient A. The association is identified during HIE registration of the patient. Patient A authorizes HCP 1011 to read/write files. HCP 1011 writes files for patient A to cloud provider 1030A to keep all patient files in one source. Similarly, write-only input for patient A, such as lab results from HCP 1048, are also written to cloud provider 1030A.

Figure 10B:
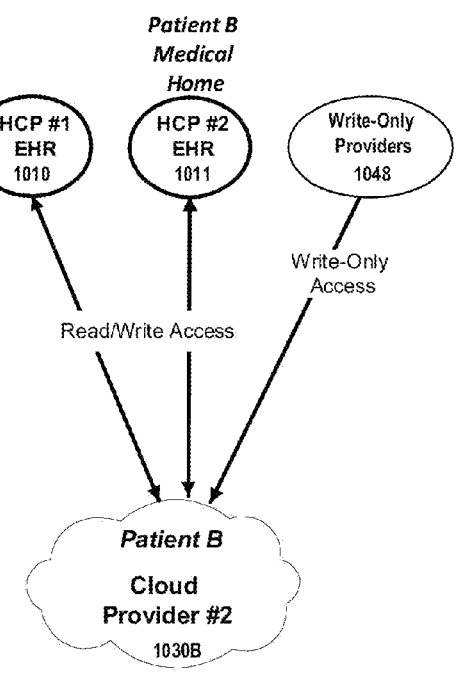

As illustrated in FIG. 10B, HCP 1011 is the medical home for patient B. HCP 1011 designates cloud provider 1030B for patient B. The association is identified during HIE registration of the patient. Patient B authorizes HCP 1010 to read/write files. HCP 1010 writes files for patient B to cloud provider 1030B to keep all patient files in one source. Similarly, write-only input for patient B, such as lab results from HCP 1048, are also written to cloud provider 1030B.

Alternative Business Models in Health Care

Figure 11:
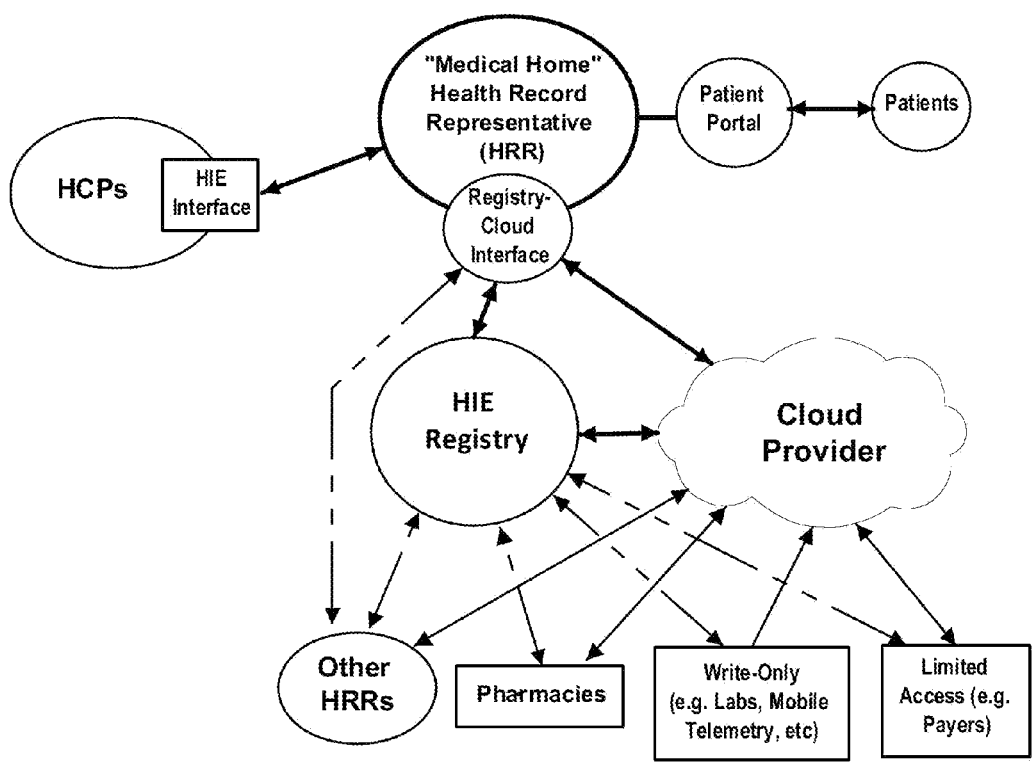
FIG. 11 is a schematic block diagram illustrating other alternate environments for the systems, devices and methods of the present application.

Given the flexibility of the described systems, devices and methods, the UHE business model could take other forms. FIG. 11 illustrates one such alternate embodiment. FIG. 11 depicts an environment similar to that of FIG. 1 except that an entity other than a health care provider may become a patient's medical home for the purposes of medical record aggregation, called a "Medical Home" Health Record Representative ("HRR").

The HCPs are or will soon be required by Federal mandate to be able to share patient records through a set of HIE standards. Thus, the HIE goals of UHE could be met even if the HCP did not directly participate in the UHE mechanism. Such an HCP would sacrifice the cost savings inherent in the UHE design in terms of reducing storage costs unless they transferred their long-term record retention responsibilities to the HRR.

The HRR could also operate a blended architecture offering a choice between the standards-based HIE-interface solution and the full UHE implementation.

Other Industries

The systems, devices and methods of the present application have been described primarily in relation to an example health care system. The systems, devices and method are also applicable in a wide variety of other industries in which confidential information needs to be selectively and securely shared among multiple business entities.

Legal Industry

Figure 12:
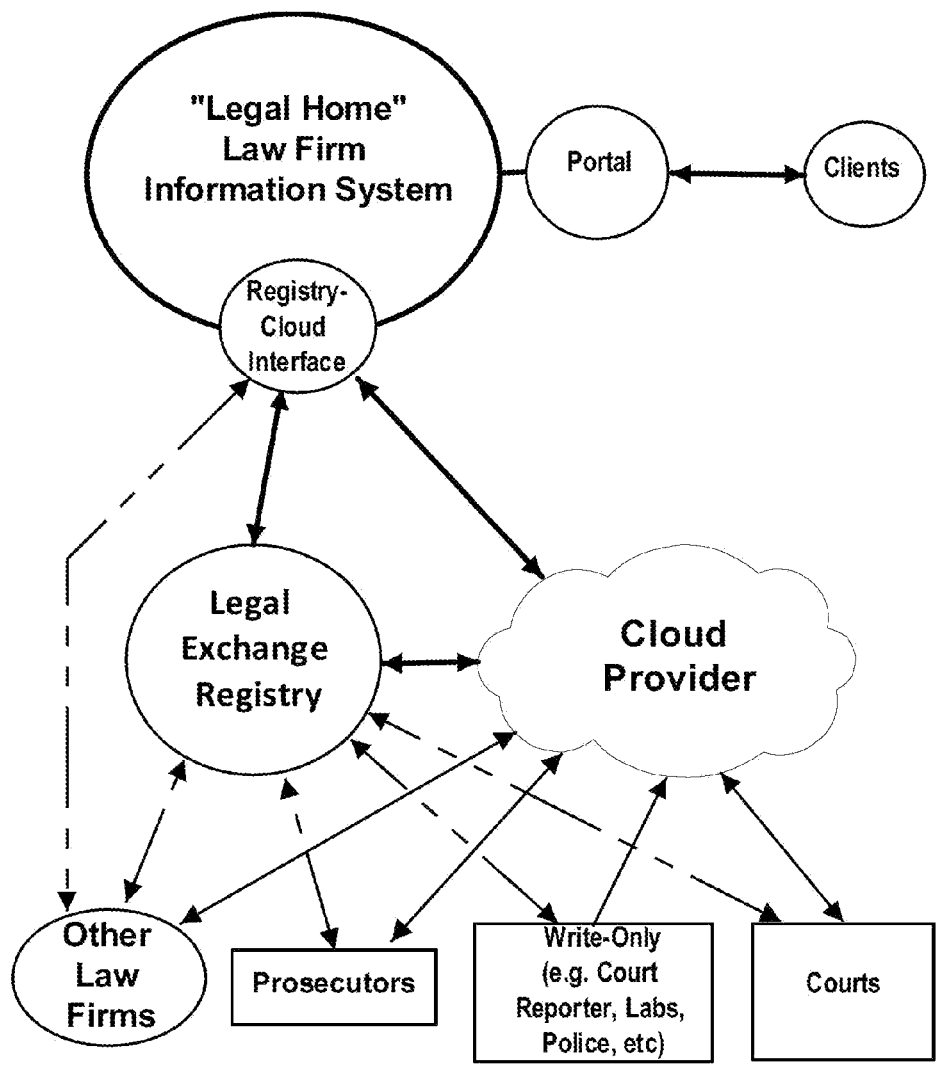
FIG. 12 is a schematic block diagram illustrating an alternate environment for the systems, devices and methods of the present application for use in the legal industry.

Referring now to FIG. 12, there is illustrated a schematic block diagram depicting a system supporting the legal industry, using a similar design as in FIG. 1 for the medical industry, but with different entities. Following the concept of the "medical home" this model addresses the creation of a "legal home" for the client. Such a "home" selection does not preclude the use of other lawyers, but the "home" lawyer does become the initial issuer and owner of the public/private key set. Similar to the health care industry, other business entities could provide the "legal home" other than law firms.

Other law firms, prosecutors and courts may be granted granular read-write access on a client-by-client basis. Write-only participants such as court reporters and labs could securely write files to the client's case file without gaining the ability to retrieve and/or decrypt any other files related to the case. The client would have a complete view of all files related to his/her case and the ability to audit access.

Real Estate Industry

Figure 13:
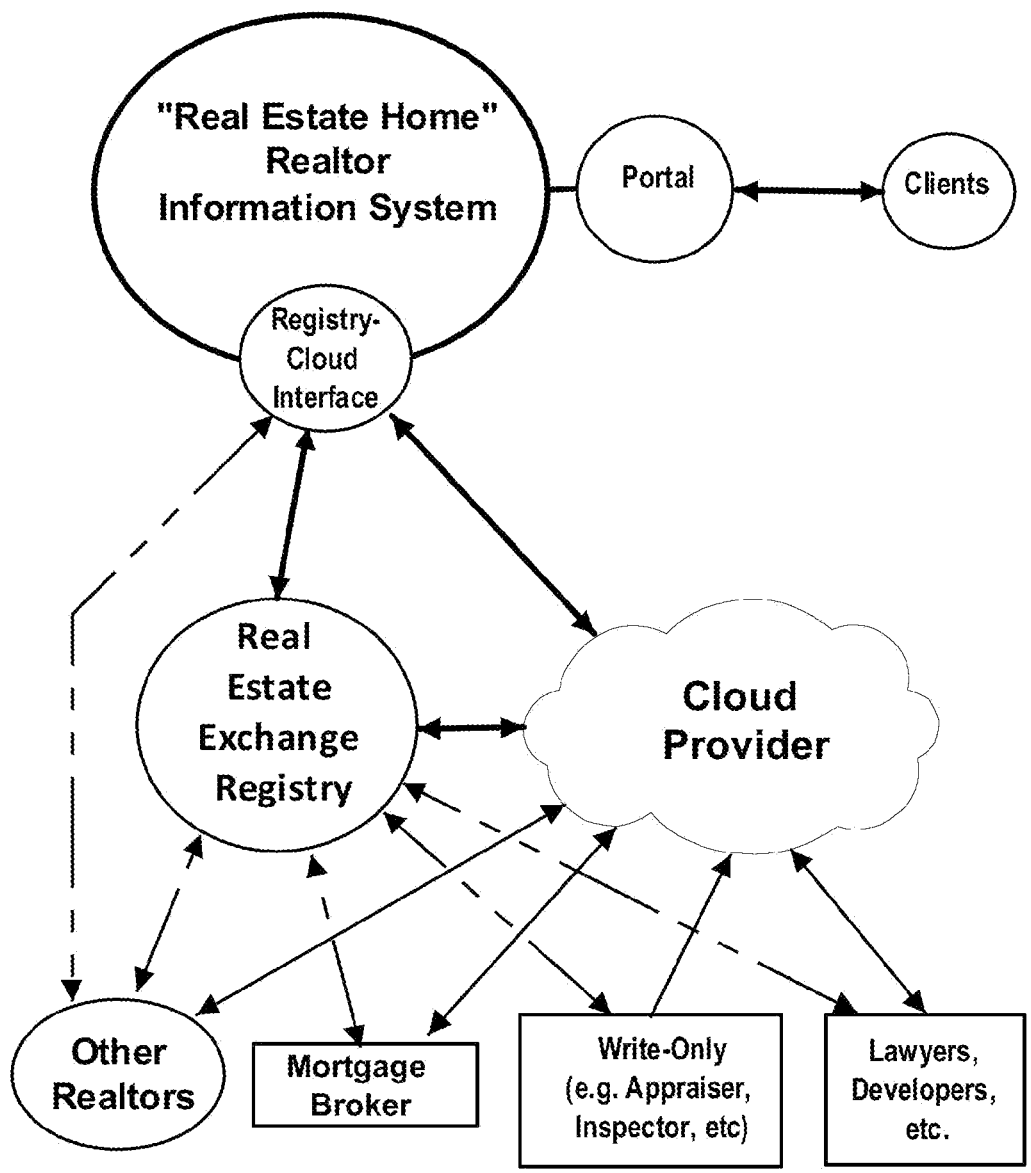
FIG. 13 is a schematic block diagram illustrating an alternate environment for the systems, devices and methods of the present application for use in the real estate industry.

Referring now to FIG. 13, there is illustrated a schematic block diagram depicting a system supporting the real estate industry, using a similar design as in FIG. 1 for the medical industry, but with different entities. Once again following the concept of the "medical home" this model addresses the creation of a "real estate home" for the client. Such a "home" selection does not preclude the use of other realtors, but the "home" realtor does become the initial issuer and owner of the public/private key set. Similar to the health care industry, other business entities may provide the "real estate home" other than real estate firms.

Other realtors, mortgage brokers, lawyers, developers, etc. may be granted granular read-write access on a client-by-client basis. Write-only participants such as appraisers and inspectors could securely write files to the client's file without gaining the ability to retrieve and/or decrypt any other files related to the business situation. The client may have a complete view of all files related to his/her business situation and the ability to audit access.

Wide Applicability

With three examples of industries that can utilize the described systems, devices and methods, one can easily imagine other applications of this flexible system in any situation in which multiple parties need to have access to confidential information regarding an individual, such as the insurance industry and social service agencies, for example.

From the information contained herein, those skilled in the art will perceive improvements, changes and modifications to the systems, devices and methods disclosed herein. Such improvements, changes and modifications within the skill of the art are intended to be covered by the present application.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Furthermore, while the systems, devices methods, and so on have been illustrated by describing examples, and while the examples have been described in considerable detail, it is not the intention of the applicants to restrict, or in any way, limit the scope of the appended claims to such detail. It is, of course, not possible to describe every conceivable combination of components or methodologies for purposes of describing the devices, systems, methods, and so on provided herein. Additional advantages and modifications will readily appear to those skilled in the art. Therefore, the invention, in its broader aspects, is not limited to the specific details and illustrative examples shown and described. Accordingly, departures may be made from such details without departing from the spirit or scope of the applicant's general inventive concept. Thus, this application is intended to embrace alterations, modifications, and variations that fall within the scope of the appended claims. The preceding description is not meant to limit the scope of the invention. Rather, the scope of the invention is to be determined by the appended claims and their equivalents.

Finally, to the extent that the term "includes" or "including" is employed in the detailed description or the claims, it is intended to be inclusive in a manner similar to the term "comprising," as that term is interpreted when employed as a transitional word in a claim. Furthermore, to the extent that the term "or" is employed in the claims (e.g., A or B) it is intended to mean "A or B or both." When the applicants intend to indicate "only A or B, but not both," then the term "only A or B but not both" will be employed. Similarly, when the applicants intend to indicate "one and only one" of A, B, or C, the applicants will employ the phrase "one and only one." Thus, use of the term "or" herein is the inclusive, and not the exclusive use. See Bryan A. Garner, A Dictionary of Modern Legal Usage 624 (2d. Ed. 1995).

What is claimed is:

1. A method for securely storing and sharing information within and between organizations using a three-part distributed interlocking system, the method comprising:
    assigning, by a first registry-cloud interface, registration information to an information owner, the registration information comprising a unique public/private key pair;
    populating, by the first registry-cloud interface, a registry with the registration information of the information owner, including the information owners public key;
    transmitting, by the registry-cloud interface, access control permissions to a cloud storage system to authorize the registry-cloud interface to store and to retrieve files to the cloud storage system for the information owner;
    receiving, by the first registry-cloud interface, information to be securely stored;
    generating, by the first registry-cloud interface, encrypted information based on the information and the unique public/private key pair; and
    storing, by the first registry-cloud interface, the encrypted information on the cloud storage system of a cloud storage provider;
    whereby the private key is maintained by the first registry-cloud interface and is not shared with the registry or the cloud storage provider.

2. The method of claim 1 wherein the receiving further comprises receiving the information from the information through a portal application.

3. The method of claim 1 further comprising:
    authorizing, by the first registry-cloud interface by updating permissions at the registry, a second registry-cloud interface to access at least a portion of the encrypted information and to store additional encrypted information;
    updating, by the registry, the access control permissions at the cloud storage system and authorizing the second registry-cloud interface to retrieve and store encrypted information of the specified information owner; and
    transmitting, from the first registry-cloud interface to the second registry-cloud interface, the private key of the information owner's unique public/private key pair, the transmitting bypassing the registry and the cloud storage system.

4. The method of claim 3 further comprising providing store-only access to the second registry-cloud interface by granting permission to the second registry-cloud interface to store but not retrieve encrypted files on the cloud storage system of the cloud storage provider based on the public key for the information owner.

5. The method of claim 3, comprising retrieving and decrypting, by the second registry-cloud interface, information of the information owner stored on the cloud storage system responsive to receiving a request for the information.

6. The method of claim 3, further comprising encrypting and storing, by the second registry-cloud interface, information of the information owner on the cloud storage system responsive to receiving a request to store the information.

7. The method of claim 3, further comprising retrieving and decrypting, by the first registry-cloud interface, information of the information owner, stored on the cloud storage system by the second registry-cloud interface, responsive to receiving a request for the information.

8. The method of claim 1 wherein the information comprises healthcare information.

9. The method of claim 1 further comprising storing, by the first registry-cloud interface, unencrypted file metadata on the cloud storage system created at the cloud storage provider.

10. The method of claim 1 further comprising determining, by the registry, at least one unique identity of an entity authorized to use the registry.

11. The method of claim 1 further comprising verifying an identity and role of an entity requesting use of the registry.

12. The method of claim 1 wherein the cloud storage system comprises access control permission for authorizing access to the cloud storage system to store and retrieve information based on owner-specific permissions received from the registry.

13. The method of claim 1, further comprising retrieving and decrypting, by the first registry-cloud interface, information of the information owner stored on the cloud storage system responsive to receiving a request for the information.

14. A system for securely storing and sharing information within and between organizations using a three-part distributed interlocking system, the system comprising:
    an information owner system of an information owner for providing information to be securely stored and retrieved;
    a cloud storage system of a cloud storage provider;
    a registry maintained and controlled a registry controller;
    a first proxy system registry-cloud interface, the first registry-cloud interface processing instructions to:
        assign to registration information to the information owner, the registration information comprising a unique public/private key pair;
        populate a registry with the registration information comprising the information owner's unique public key;
        receive the information to be securely stored;
        generate encrypted information based on the information to be securely stored and the information owner's unique public/private key pair; and
        store the encrypted information on a cloud storage system of a cloud storage provider as authorized by the registry;
    wherein the cloud storage system is configured to use access control permissions received from the registry to control access to an information owner's information;
    wherein the registry is configured to verify and manage identities, catalog permissions, and transmit permission changes to the cloud storage system; and
    wherein the private key is retained by the first registry-cloud interface and not shared with the registry or the cloud storage provider.

15. The system of claim 14 further comprising a portal application for the first registry-cloud interface to receive the information from the information owner.

16. The system of claim 14 further comprising:
    a second registry-cloud interface;
    wherein the first registry-cloud interface further processing instructions to:
        authorize the second registry-cloud interface, by updating permissions at the registry, to access at least a portion of the encrypted information and to store encrypted information; and transmit to the second registry-cloud interface a private key of the information owner's unique public/private key pair, wherein the transmitting bypasses the registry and the cloud storage system.

17. The system of claim 16, the second registry-cloud interface further processing instructions to retrieve and decrypt the information owner's information on the cloud storage system.

18. The system of claim 16, the second registry-cloud interface further processing instructions to encrypt and store the information owner's information on the cloud storage system.

19. The system of claim 16, the first registry-cloud interface further processing instructions to retrieve and decrypt the information on the cloud storage system stored by the second registry-cloud interface.

20. The method of claim 14 wherein the information comprises healthcare information.

21. The system of claim 14, the first registry-cloud interface further processing instructions to retrieve and decrypt the information owner's information on the cloud storage system.

* * * * *